(12) United States Patent
Kudou

(10) Patent No.: US 8,198,861 B2
(45) Date of Patent: Jun. 12, 2012

(54) ELECTRONIC DEVICE AND CONNECTOR FITTING METHOD

(75) Inventor: Hiroshi Kudou, Tokyo (JP)

(73) Assignee: NEC Corporation, Tokyo (JP)

( * ) Notice: Subject to any disclaimer, the term of this patent is extended or adjusted under 35 U.S.C. 154(b) by 444 days.

(21) Appl. No.: 12/303,142

(22) PCT Filed: May 28, 2007

(86) PCT No.: PCT/JP2007/060793
§ 371 (c)(1),
(2), (4) Date: Dec. 3, 2008

(87) PCT Pub. No.: WO2007/142060
PCT Pub. Date: Dec. 13, 2007

(65) Prior Publication Data
US 2009/0206800 A1 Aug. 20, 2009

(30) Foreign Application Priority Data
Jun. 2, 2006 (JP) .................. 2006-155426

(51) Int. Cl.
*H02J 7/00* (2006.01)
(52) U.S. Cl. ............................ 320/114; 320/160; 439/39
(58) Field of Classification Search .................. 320/114, 320/160; 439/39, 40
See application file for complete search history.

(56) References Cited

U.S. PATENT DOCUMENTS

| | | | | |
|---|---|---|---|---|
| 6,616,468 B2* | 9/2003 | Sakiyama | ...................... | 439/181 |
| 6,875,035 B2* | 4/2005 | Sakiyama | ...................... | 439/181 |
| 6,897,370 B2* | 5/2005 | Kondo et al. | .................. | 136/243 |
| 7,311,526 B2* | 12/2007 | Rohrbach et al. | ................ | 439/39 |
| 7,351,066 B2* | 4/2008 | DiFonzo et al. | ................. | 439/39 |
| 7,775,801 B2* | 8/2010 | Shiff et al. | ........................ | 439/39 |
| 2006/0145663 A1* | 7/2006 | Shiff et al. | ...................... | 320/125 |
| 2007/0072442 A1* | 3/2007 | DiFonzo et al. | ................ | 439/39 |

FOREIGN PATENT DOCUMENTS

| | | |
|---|---|---|
| DE | 10056410 A1 | 5/2002 |
| JP | 1986170243 A | 7/1986 |
| JP | 1998225000 A | 8/1998 |
| JP | 2005045490 A | 2/2005 |

OTHER PUBLICATIONS

Chinese Office Action for CN200780020401.1 issued Jan. 18, 2012.

* cited by examiner

*Primary Examiner* — Ramy Ramadan

(57) ABSTRACT

An electronic device (30) of the this invention includes an external device connecting connector (33) to be connected to a power supplying connector (40) of an external device (41) having a power supplying function, an electronic circuit (31) which performs predetermined operation upon reception of power supplied from the external device through the external device connecting connector, and an electromagnet (32) which is provided to the external device connecting connector and electrically connected between the external device connecting connector and the electronic circuit. The electromagnet generates a magnetic force when a power supply current supplied from the external device flows through it, and attracts a predetermined portion formed of a magnetic body of the power supplying connector, to maintain a fitting state between the external device connecting connector and the power supplying connector. Thus, the fitting state becomes reliable. When supply of the power supply current from the external device is stopped, the fitting state is canceled. Thus, the power supplying connector can be pulled out from the external device connecting connector readily, so that any damages can be prevented.

10 Claims, 9 Drawing Sheets

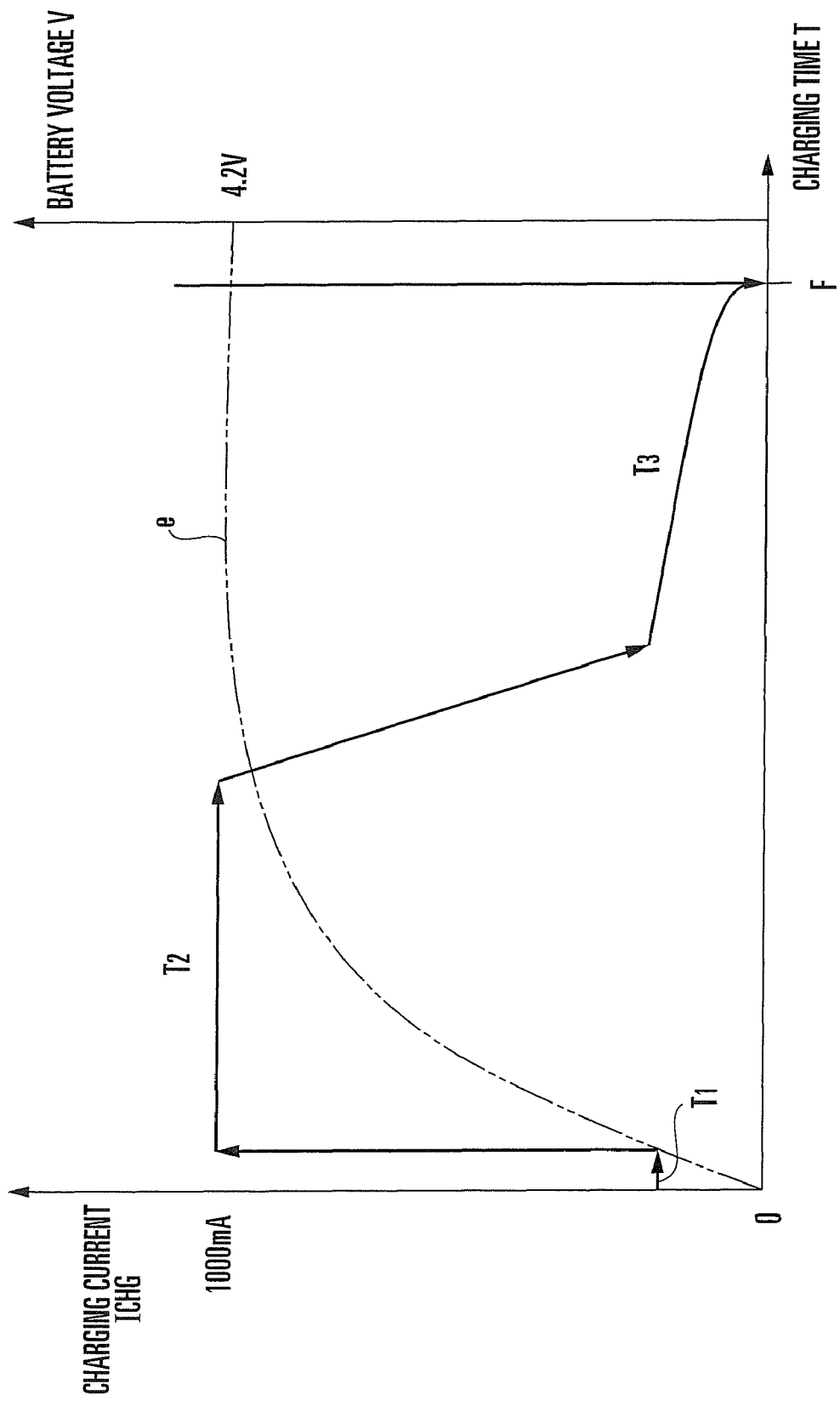
F I G. 9

ELECTRONIC DEVICE AND CONNECTOR FITTING METHOD

TECHNICAL FIELD

This application is based upon and claims the benefit of priority from the prior Japanese Patent Application No. 2006-155426, filed Jun. 2, 2006, the entire contents of which are incorporated herein by reference.

The present invention relates to an electronic device and a connector fitting method employed by the electronic device and, more particularly, to an electronic device and a connector fitting method which are suitably adopted when connecting a power supplying connector to an external device connecting connector.

BACKGROUND ART

In a portable telephone set, when charging a rechargeable battery mounted in it, the power supplying connector of a charger is connected to an external device connecting connector. In recent years, the housing of the portable telephone set is becoming more compact and thinner than before. Accordingly, the connectors are also becoming compact and thin. The size and thickness of a connector tend to be inversely proportional to the physical strength of the connector. When inserting and pulling out the connectors, the connectors or their peripheral portions may be damaged. In view of this, countermeasures to prevent damages are taken by, e.g., changing the material of the connectors from a conventional plastic material to a metal.

As an example of a portable telephone set of this type, for example, one shown in FIG. 6 is available.

This portable telephone set 1 has, e.g., a foldable housing, and comprises a unit 2, unit 3, and hinge 4, as shown in FIG. 6. The unit 2 comprises a display 5 and receiver 6 on its front surface. The unit 3 comprises a microphone 7 and operation keys 8a and 8b on its front surface, a connector 9 on its end face, and incorporates a controller and rechargeable battery (not shown). The units 2 and 3 are folded through the hinge 4 such that their front surfaces oppose each other.

An AC adapter 10 to charge the rechargeable battery is prepared as an accessory to the portable telephone set 1. The AC adapter 10 is provided with an AC power supply plug 11, cable 12, plug 13, and notice tag 14. When charging, the plug 13 is connected to the connector 9. The notice tag 14 describes notices concerning the attaching/detaching (inserting/pulling-out) operation of the plug 13. The AC adapter 10 supplies power with a charging voltage of 4.2 V/1,000 mA that matches the standard of the rechargeable battery formed of, e.g., a lithium ion battery.

As shown in FIG. 7, the connector 9 of the portable telephone set 1 has an iron metal case 9a. The iron metal case 9a is provided with metal claw catches 9b at predetermined portions. The plug 13 of the AC adapter 10 is provided with iron metal claws 13a and metal claw release hooks 13b. When fitting the connector 9 and plug 13 with each other, the iron metal claws 13a of the plug 13 are fitted with the metal claw catches 9b of the connector 9. Thus, the connector 9 and plug 13 are reliably fitted with each other to ensure electrical characteristics. When pulling out the plug 13 from the connector 9, the user pinches the metal claw release hooks 13b, so that the iron metal claws 13a disengage from the metal claw catches 9b.

As shown in FIG. 8, the portable telephone set 1 has a power supply unit 20. The power supply unit 20 comprises a charging circuit 21 and battery 22. The portable telephone set 1 is connected to the AC adapter 10 through the plug 13 in FIG. 6. The AC adapter 10 supplies power to the power supply unit 20 of the portable telephone set 1 through a + terminal VCHG and ground terminal GND of the plug 13 and the connector 9 of the portable telephone set 1.

FIG. 9 shows an example of the characteristics of the charging current of the battery 22 in FIG. 8. The axis of ordinate represents a charging current ICHG or battery voltage V, and the axis of abscissa represents a charging time T.

As shown in FIG. 9, during a preliminary charging period $T_1$ immediately after the start of charging, the charging circuit 21 is controlled to preliminarily charge the battery 22. The relationship between a voltage value (battery voltage) e of the battery 22 and the time is monitored to check if there is any abnormality. If the voltage value e satisfies a prescription value and charging of the battery 22 is normal, the charging process shifts to a quick charging period $T_2$. During the quick charging period $T_2$, the charging current ICHG of about 1,000 mA is supplied to the battery 22 to perform constant current driving. The charging voltage is thus quickly raised to near 4.2 V to perform charging. After that, when the voltage value e reaches near the rated value of 4.2 V, the charging process shifts to a trickle charging period $T_3$. During the trickle charging period $T_3$, the charging current ICHG corresponding to the voltage difference between the AC adapter 10 and battery 22 is supplied to the battery 22 to perform constant current driving. As the voltage difference gradually decreases, the charging current also decreases. When the voltage difference disappears at a point F, charging is completed. At this time, the charging current value is zero.

Other than the portable telephone set 1 described above, as a related technique, for example, one described in reference 1 (Japanese Patent Laid-Open No. 2005-045490) is available.

According to the connector structure of the portable terminal device described in reference 1, an electromagnet is attached to a connector main body, and a metal piece to be attracted by the electromagnet is attached to a connector connection port. A switching circuit performs switching between energization and non-energization to the electromagnet on the basis of a control signal output from a portable terminal device main body.

DISCLOSURE OF INVENTION

Problems to be Solved by the Invention

The portable telephone set described above has the following problems.

In the portable telephone set 1 shown in FIG. 7, the connector 9 and plug 13 are fitted with each other as the iron metal claws 13a of the plug 13 are fitted with the metal claw catches 9b of the connector 9. When the operator pinches the metal claw release hooks 13b, they disengage from the metal claw catches 9b, so that the plug 13 can be pulled out from connector 9. At this time, if the user does not pull out the plug 13 correctly, the iron metal claws 13a do not disengage from the metal claw catches 9b but are kept fixed by them. Then, the user may perform "twisting" operation to try to forcibly pull out the plug 13, undesirably damaging the connector 9 and plug 13. As a countermeasure against this, the plug 13 and notice tag 14 show notices concerning how to operate the metal claw release hooks 13b. This, however, is insufficient as a radical countermeasure. Particularly, in foreign countries, people may often operate the metal claw release hooks 13b in a manner different from that practiced in Japan. Then, when pulling out the plug 13, the connector 9 or plug 13 may be damaged frequently.

In the connector structure of the portable terminal device described in reference 1, switching takes place between energization/non-energization to the electromagnet on the basis of the control signal output from the portable terminal device main body. Although the object of reference 1 is similar to that of the present invention, its configuration is different.

The present invention has been made in view of the above situation, and has as its object to provide an electronic device and a connector fitting method with which when disengaging a power supplying connector from an external device connecting connector, damages to the connectors are prevented.

Means of Solution to the Problems

In order to solve the above problems, the present invention comprises an external device connecting connector which is connected to a power supplying connector of an external device having a power supplying function and receives power supplied from the external device, an electronic circuit which performs predetermined operation upon reception of the power supplied from the external device through the external device connecting connector, and an electromagnet which is provided to the external device connecting connector and electrically connected between the external device connecting connector and the electronic circuit, generates a magnetic force when a power supply current supplied from the external device flows therethrough, and attracts a predetermined portion formed of a magnetic body of the power supplying connector, to maintain a fitting state between the external device connecting connector and the power supplying connector.

The present invention also comprises the step of fitting a power supplying connector of an external device having a power supplying function to an external device connecting connector of an electronic device which receives power from the external device, and the step of fitting the two connectors so that an electromagnet which is provided to the external device connecting connector and electrically connected between the external device connecting connector and the electronic circuit generates a magnetic force when a power supply current supplied from the external device flows to an electronic circuit of the external device, and attracts a predetermined portion formed of a magnetic body of the power supplying connector, thus maintaining a fitting state between the external device connecting connector and the power supplying connector.

Effect of the Invention

According to the present invention, the external device connecting connector is provided with the electromagnet. When the power supply current supplied from the external device flows through the electromagnet, the electromagnet generates a magnetic force and attracts the magnetic body of the power supplying connector of the external device, thus maintaining the fitting state between the external device connecting connector and power supplying connector. Hence, the fitting state becomes reliable. When supply of the power supply current from the external device is stopped, the fitting state is canceled. Then, the power supplying connector can be pulled out from the external device connecting connector readily, so that damages can be prevented.

BRIEF DESCRIPTION OF DRAWINGS

FIG. 9 is a graph showing an example of the characteristics of the charging current of a battery in FIG. 8.

BEST MODE FOR CARRYING OUT THE INVENTION

The exemplary embodiments of the present invention will be described in detail with reference to the drawings.

First Exemplary Embodiment

Figure 1:
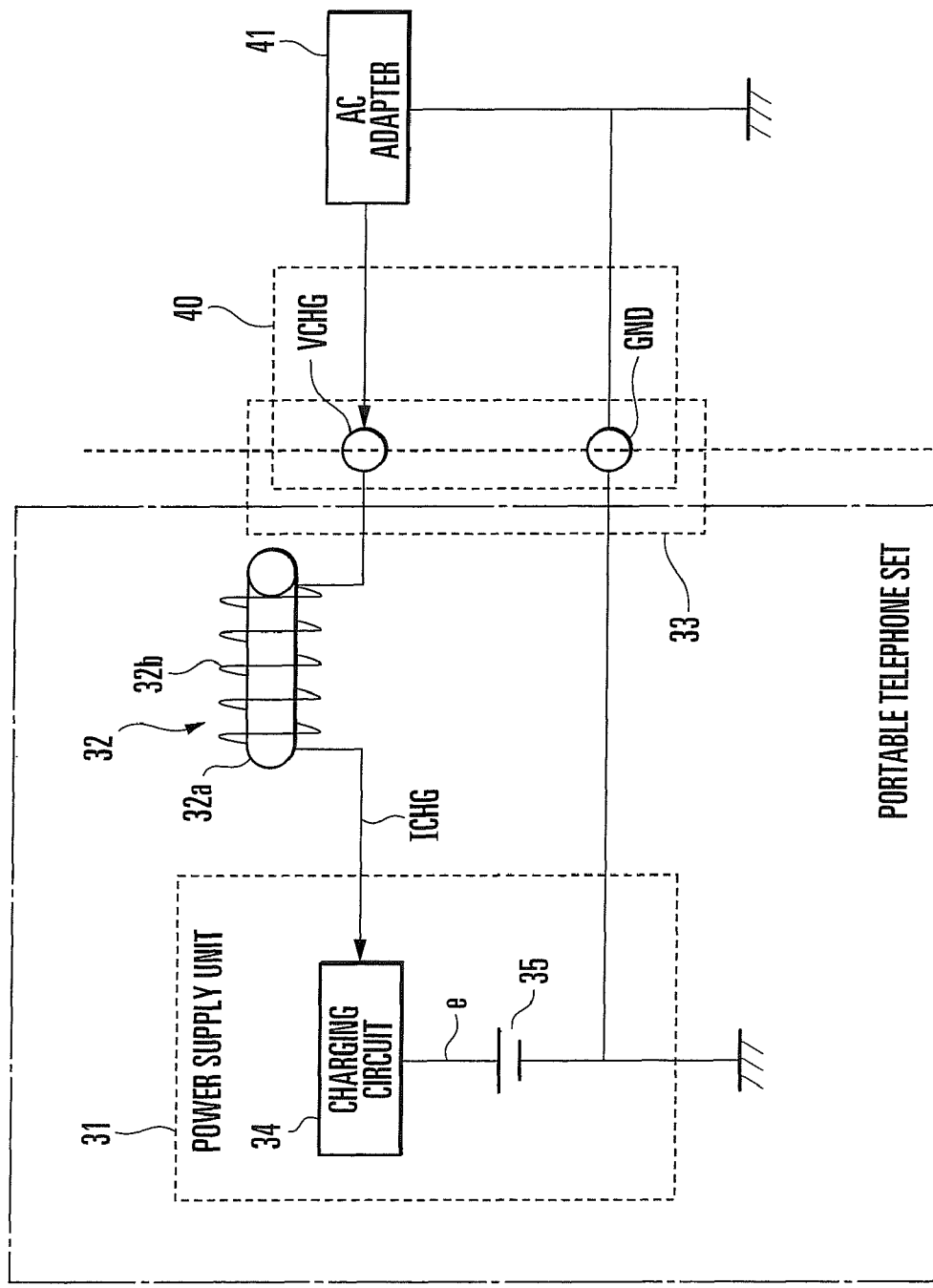
FIG. 1 is a circuit diagram showing the electrical configuration of the main part of an electronic device according to the first exemplary embodiment of the present invention.

FIG. 1 shows the electrical configuration of the main part of a portable telephone set 30 as first exemplary embodiment of the electronic device of the present invention.

This portable telephone set 30 has a power supply unit (electronic circuit) 31, electromagnet 32, and connector (external device connecting connector) 33. The power supply unit 31 comprises a charging circuit 34 and battery 35 (rechargeable battery). The electromagnet is electrically connected in series between the connector 33 and power supply unit 31. The portable telephone set 30 is connected to an AC adapter 41 (an electronic device, a charging power supply device) through a plug (power supplying connector) 40. The AC adapter 41 has a function of supplying power to the portable telephone set 30. The connector 33 serves to receive power supplied from the AC adapter 41. Power is supplied from the AC adapter 41 to the power supply unit 31 of the portable telephone set 30 through a + terminal VCHG and ground terminal GND of the plug 40, the connector 33 of the portable telephone set 30, and a coil 32b of the electromagnet 32.

The electromagnet 32 is formed by winding the coil 32b around a core 32a. In particular, according to this exemplary embodiment, the electromagnet 32 accompanies or is arranged in the vicinity of the connector 33. When a power supply current supplied from the AC adapter 41 flows through the electromagnet 32, the electromagnet 32 generates a magnetic force. If a predetermined portion of the plug 40 is formed of a magnetic body (iron metal), the electromagnet 32 attracts the magnetic body, thus maintaining the fitted state with the connector 33. The charging circuit 34 receives power supplied from the AC adapter 41 through the connector 33 to charge the battery 35. In a quick charging period $T_2$ in which the voltage difference between the voltage of the power supply and that of the battery 35 is a predetermined value or more, the electromagnet 32 is constant-current driven by the charging current ICHG having a predetermined current value. Thus, a constant fitting state is maintained between the plug 40 and connector 33. In a trickle charging period $T_3$ in which the voltage difference becomes smaller than the predetermined value, the charging circuit 34 drives the electromagnet 32 with the charging current ICHG having a current value corresponding to the voltage difference to gradually weaken the fitting state between the plug 40 and connector 33. When the voltage difference disappears at a charging end point F, no charging current ICHG flows through the electromagnet 32. By utilizing these characteristics, supply of the charging current ICHG is stopped, thus canceling the fitted state.

Figure 2:
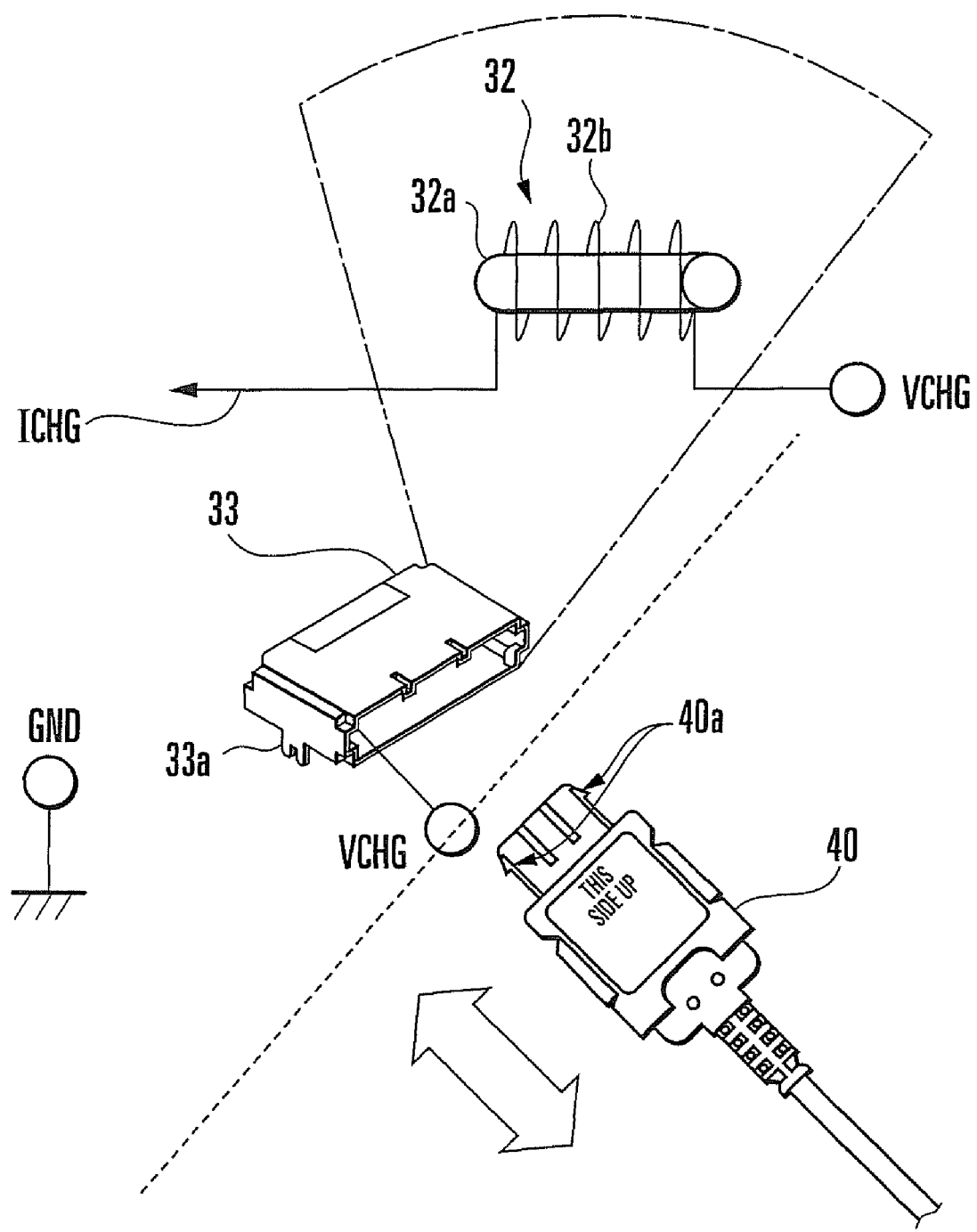
FIG. 2 is a view showing the structures of the main parts of a connector and plug in FIG. 1.

As shown in FIG. 2, the plug 40 of the AC adapter 41 is provided with an iron metal portion (magnetic body) 40a at a predetermined portion. The connector 33 of the portable telephone set 30 has the iron metal case (magnetic body case) 33a which fits with the plug 40. The electromagnet 32 is arranged adjacent to the iron metal case 33a. The electromagnet 32 may be arranged at, e.g., that position on the connector 33 which opposes the iron metal portion 40a of the plug 40 when the connector 33 fits with the plug 40.

Figure 3:
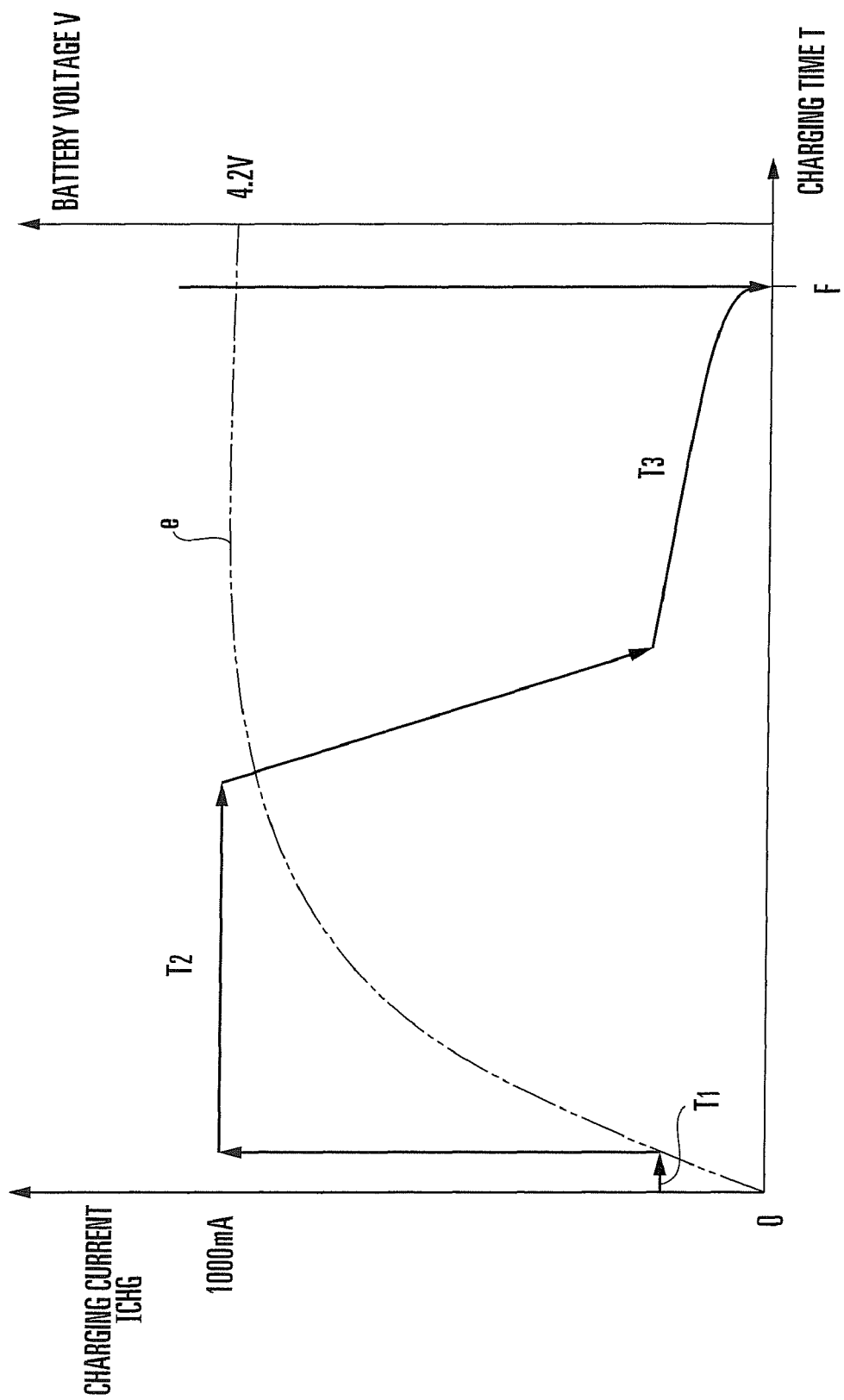
FIG. 3 is a graph showing an example of the characteristics of the charging current of a battery in FIG. 2.

FIG. 3 shows an example of the characteristics of the charging current of the battery 35 in FIG. 2. The axis of ordinate represents a charging current ICHG or battery voltage V, and the axis of abscissa represents a charging time T. The processing content of the connector fitting method employed by the portable telephone set 30 will be described with reference to FIG. 3.

In the portable telephone set 30, when the power supply current supplied from the AC adapter 41 flows through the electromagnet 32, the electromagnet 32 generates a magnetic force to attract the iron metal portion 40a of the plug 40 of the AC adapter 41, so that the fitting state between the plug 40 and connector 33 is maintained.

More specifically, as shown in FIG. 3, during a preliminary charging period $T_1$ immediately after the start of charging, the charging circuit 34 is controlled to preliminarily charge the battery 35. The relationship between a voltage value (battery voltage) e of the battery 35 and the time is monitored to check if there is any abnormality. If the voltage value e satisfies a prescription value and charging of the battery 35 is normal, the charging process shifts to a quick charging period $T_2$. During the quick charging period $T_2$, the charging current ICHG of about 1,000 mA is supplied to the battery 35 to quickly raise the charging voltage to near 4.2 V to perform charging. At this time, the electromagnet 32 is driven by a constant current, and a constant fitting state is maintained between the plug 40 and connector 33. After that, when the voltage value e reaches near the rated value of 4.2 V, the charging process shifts to a trickle charging period $T_3$. During the trickle charging period $T_3$, the charging current ICHG corresponding to the voltage difference between the AC adapter 41 and battery 35 is supplied to the battery 35. Simultaneously, the electromagnet 32 is driven with a constant voltage. As the voltage difference gradually decreases, the charging current also decreases to gradually weaken the fitting state between the plug 40 and connector 33. When the voltage difference disappears at a point F, charging is completed. At the same time, the electromagnet 32 stops operation, thus canceling the fitting state between the plug 40 and connector 33. The value of the charging current ICHG at this time is zero.

A magnetic force B generated by the electromagnet 32 is expressed by the following equation (1):

$$B = \mu \cdot N \cdot ICHG \quad (1)$$

where
$\mu$: magnetic permeability,
N: number of turns of the coil 32b,
ICHG: charging current value,
$\mu = \mu_0 \, \mu_s$ $\mu_0$: magnetic permeability of vacuum, and
$\mu_s$: specific magnetic permeability From equation (1), the magnetic force B is proportional to the number of turns of the coil 32b and the magnitude of the charging current ICHG.

As described above, according to the first exemplary embodiment, the electromagnet 32 is arranged adjacent to the iron metal case 33a of the connector 33. During charging of the battery 35, the power supply current supplied from the AC adapter 41 flows through the electromagnet 32. Hence, the electromagnet 32 generates the magnetic force to attract the iron metal portion 40a of the plug 40, thus maintaining the fitting state between the plug 40 and the connector 33. After that, when charging is completed, the electromagnet 32 stops operation, so that the fitting state between the plug 40 and connector 33 is canceled. Therefore, the plug 40 can be pulled out from the connector 33 readily, thus preventing damages.

Second Exemplary Embodiment

Figure 4:
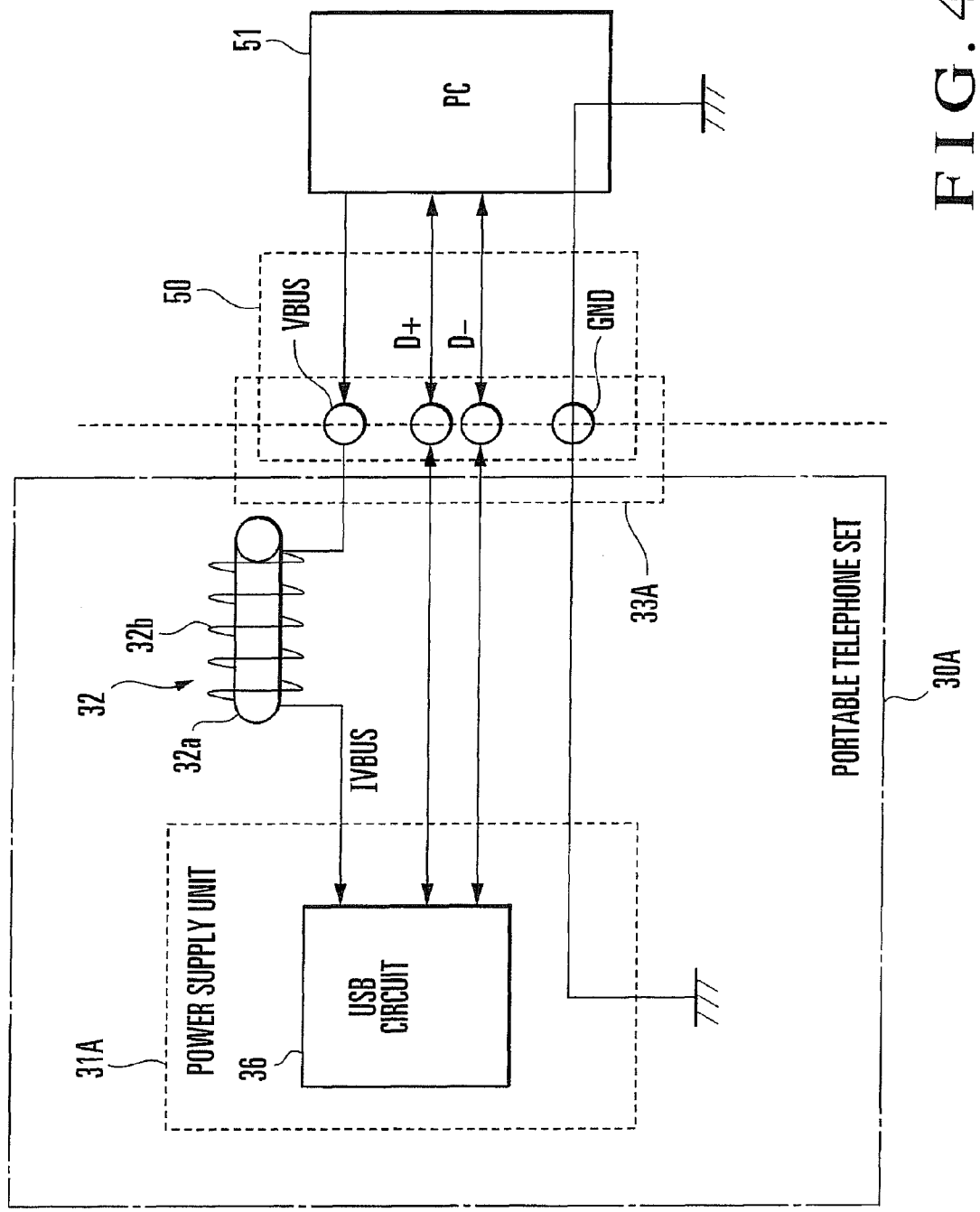
FIG. 4 is a circuit diagram showing the electrical configuration of the main part of a portable telephone set according to the second exemplary embodiment of the present invention.

FIG. 4 shows the electrical configuration of the main part of a portable telephone set 30A as the second exemplary embodiment of the electronic device of the present invention. In FIG. 4, elements that are common with those in FIG. 1 showing the first exemplary embodiment are denoted by the same reference numerals.

The portable telephone set 30A is provided with, in place of the power supply unit 31 and connector 33 in FIG. 1, a power supply unit (electronic circuit) 31A and connector (external device connecting connector) 33A having different arrangements. The connector 33A complies with the USB (Universal Serial Bus) standard. An electromagnet 32 is arranged adjacent to the connector 33A. The connector 33A is connected to a personal computer (PC) 51 as an external device through a plug 50 governed by the USB standard. That portion (not shown) of the plug (power supplying connector) 50 which is to fit with the connector 33A is made of an iron metal. The connector 33A serves to receive power from the personal computer 51. A power supply current IVBUS is supplied from the personal computer 51 to the power supply unit 31A of the portable telephone set 30A through a + terminal VBUS and ground terminal GND of the plug 50, the connector 33A of the portable telephone set 30A, and a coil 32b of the electromagnet 32. On the basis of the specifications of the USB standard, the power supply has a voltage of 5 V and a supply current of 100 mA or 500 mA. The power supply unit 31A has a USB circuit 36. The USB circuit 36 is operated by power supplied to it, and performs predetermined data communication with the personal computer 51 through terminals D+ and D− of the plug 50. Except for this, the configuration of FIG. 4 is the same as that of FIG. 1.

In the portable telephone set 30A, the electromagnet 32 is arranged adjacent to the connector 33A. During data communication with the personal computer 51, the power supply current supplied from the personal computer 51 flows through the electromagnet 32. Hence, the electromagnet 32 generates the magnetic force to attract the fitting portion (iron metal) of the plug 50, thus maintaining the fitting state between the plug 50 and connector 33A. After that, when communication is completed, the electromagnet 32 stops operation so that the fitting state between the plug 50 and connector 33A is canceled. Therefore, the plug 50 can be pulled out from the connector 33 readily, thus preventing damages.

Although the exemplary embodiments of the present invention have been described in detail with reference to the drawings, the specific arrangement is not limited to those of the exemplary embodiments described above. Any design changes within the spirit and scope of the gist of the present invention is incorporated in the present invention.

Figure 5:
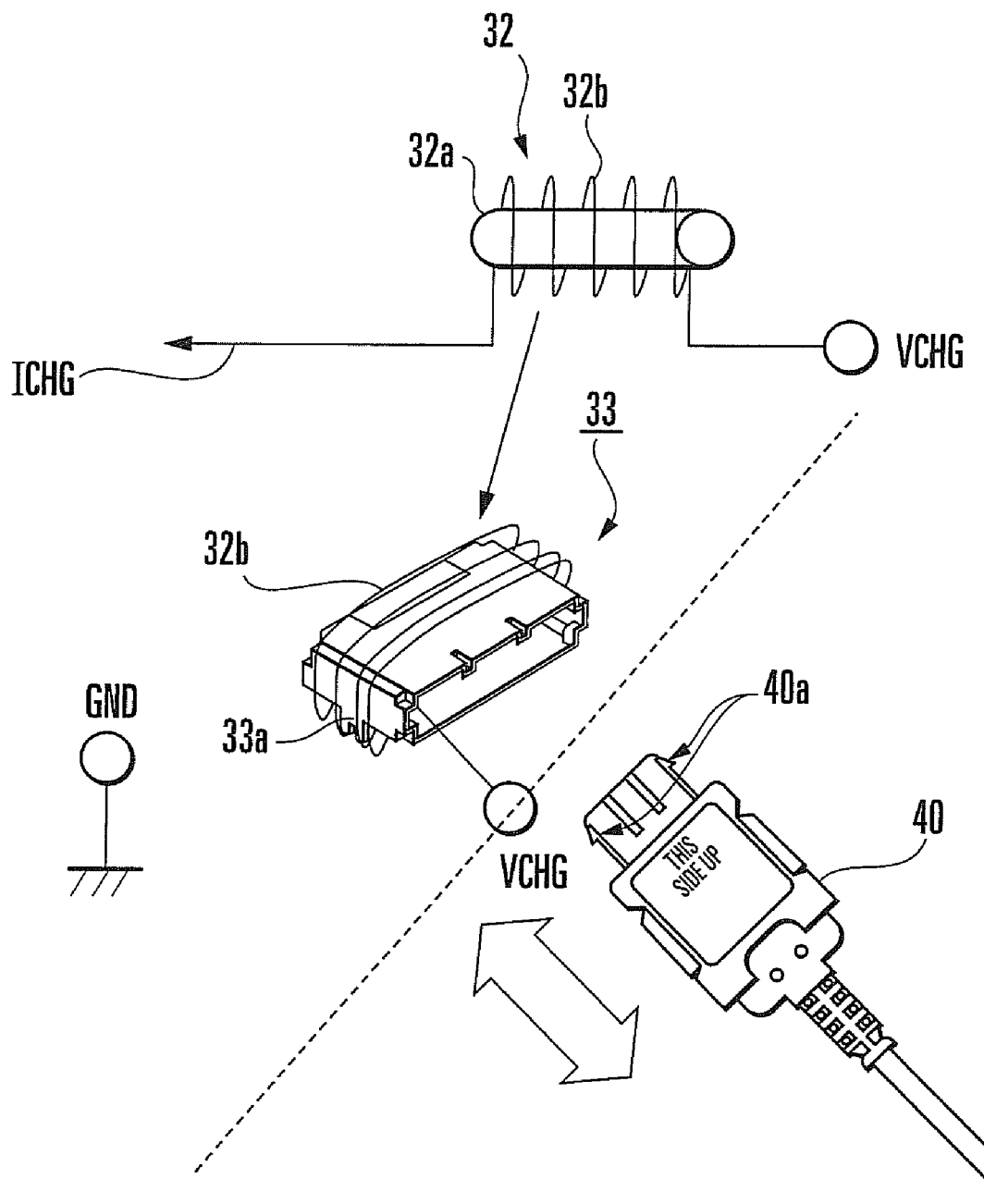
FIG. 5 is a view showing a modification of the arrangement of the connector in FIG. 2.
Figure 6:
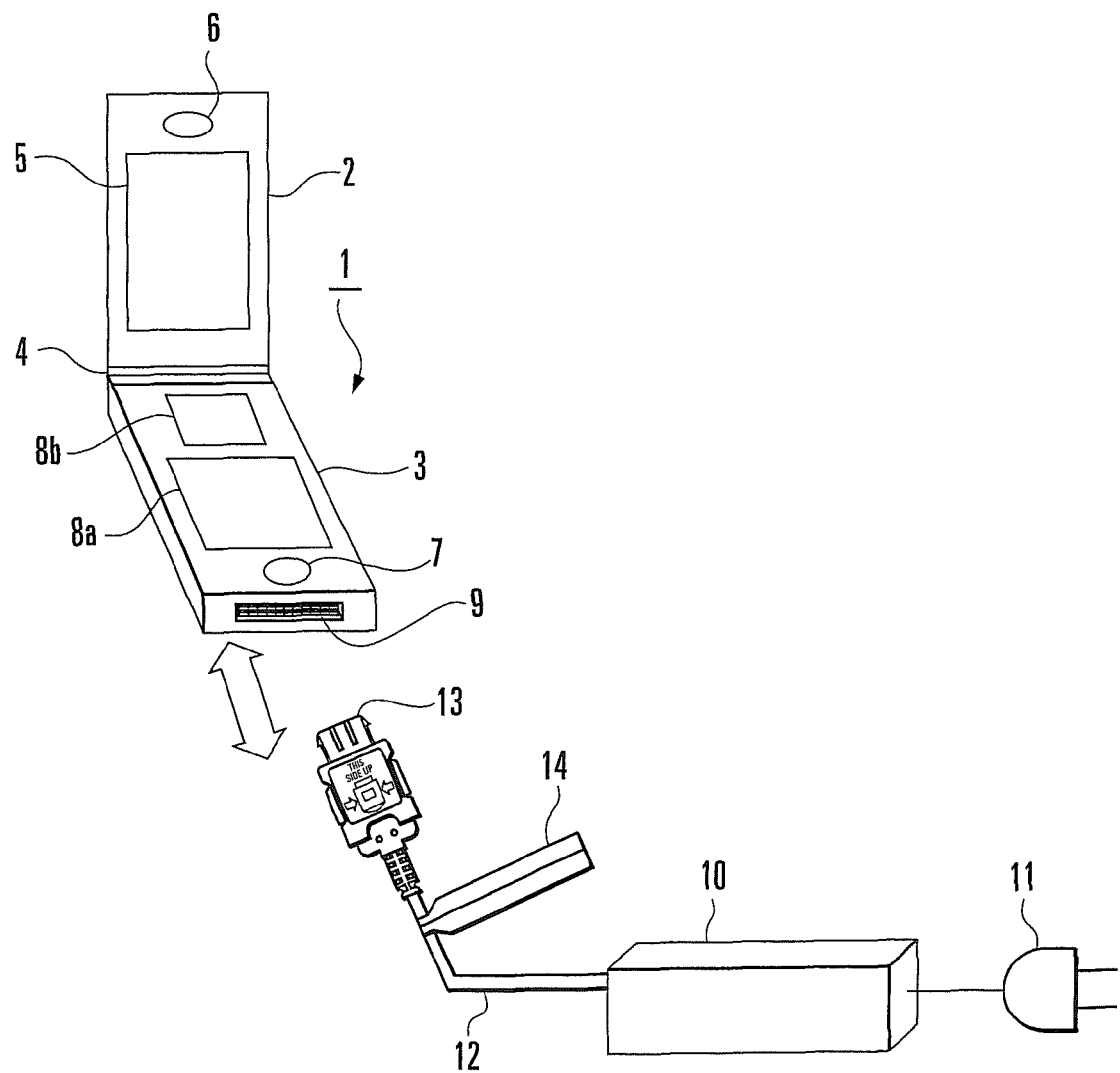
FIG. 6 is a perspective view showing an open state of a portable telephone set related to the present invention which has a foldable housing.
Figure 7:
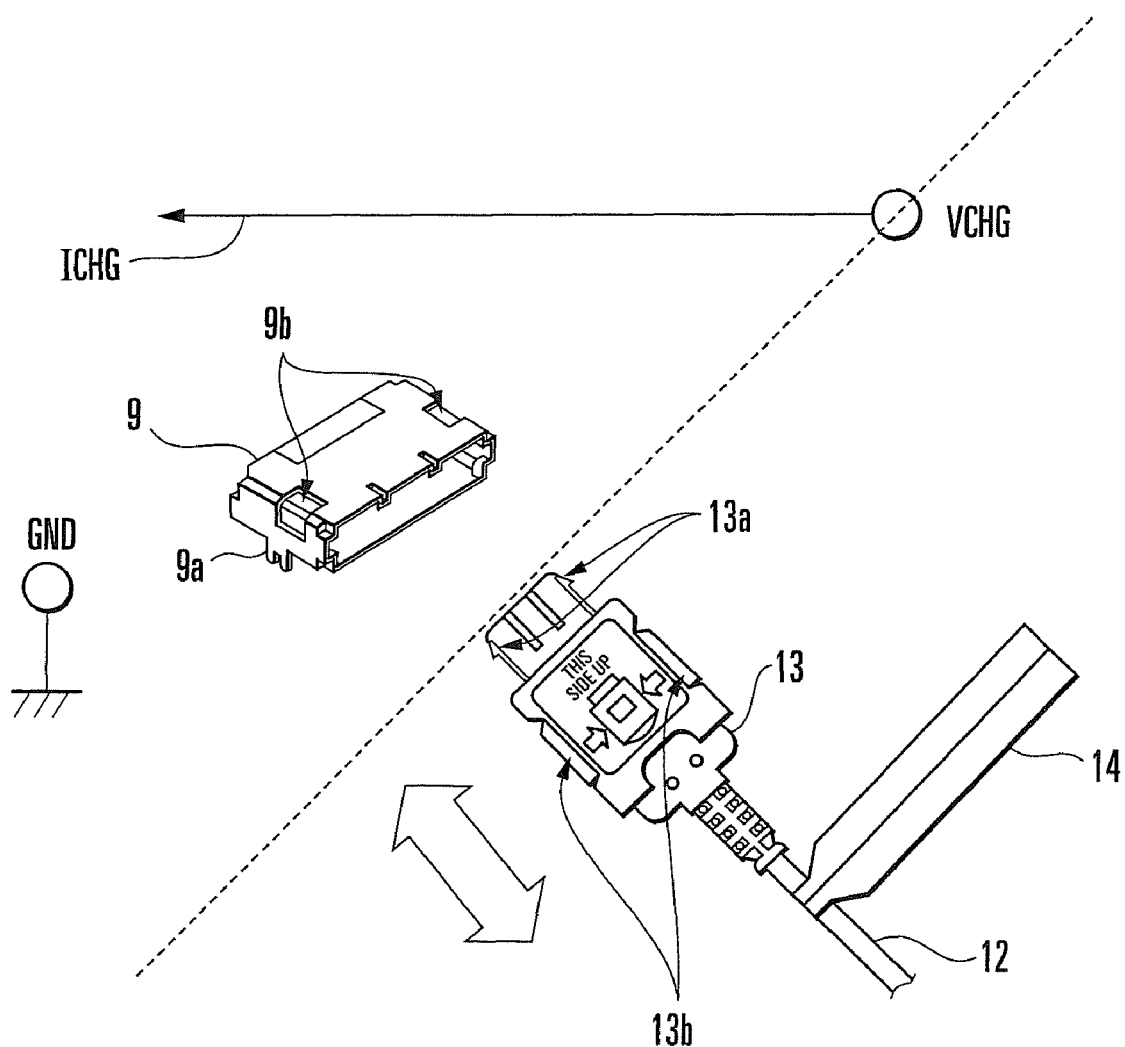
FIG. 7 is a view showing the structures of the main parts of a connector and plug in FIG. 6.
Figure 8:
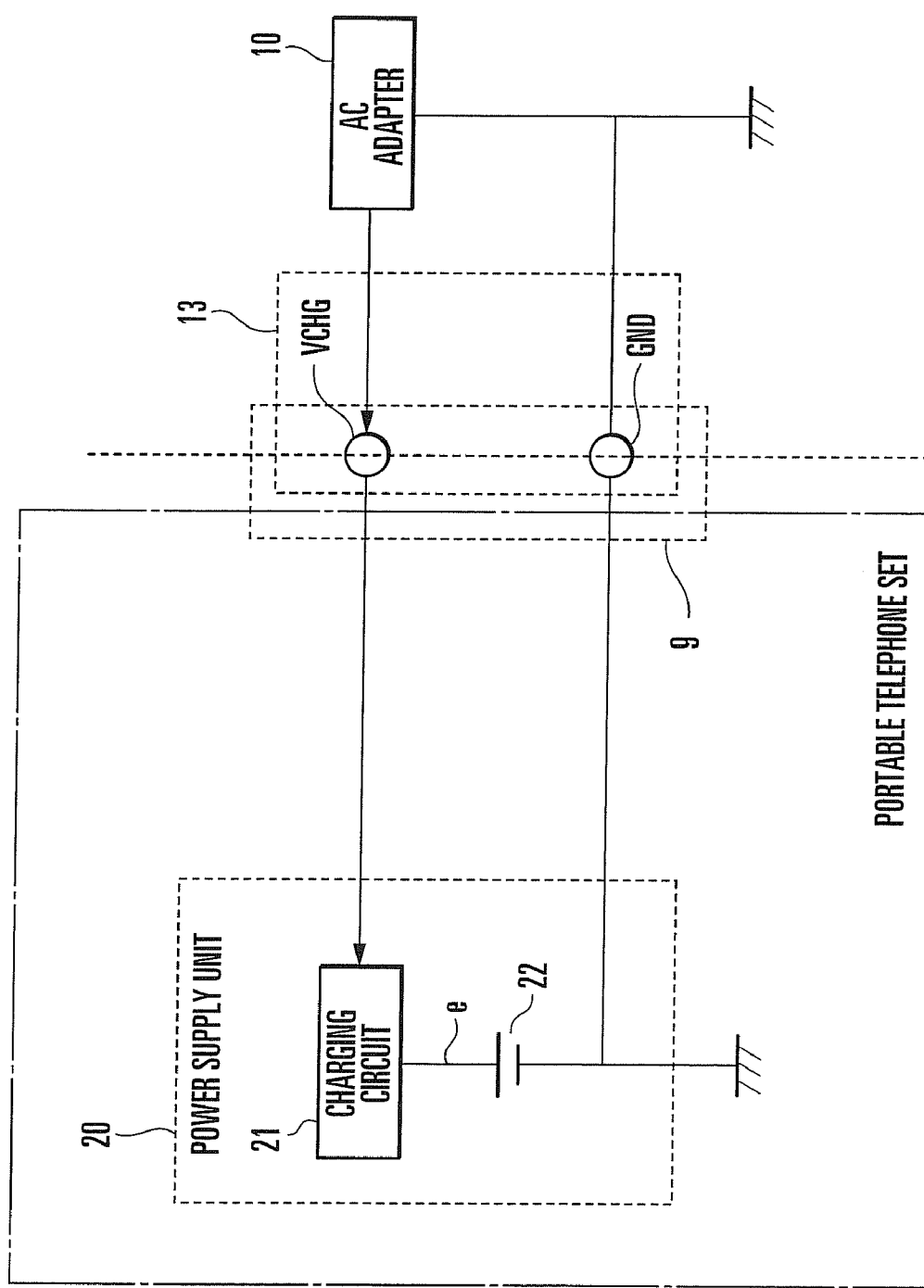
FIG. 8 is a diagram showing the electrical configuration of the main part of the portable telephone set in FIG. 6 and the AC adapter of the portable telephone set.

For example, as shown in FIG. 5, the electromagnet 32 may be formed by winding the coil 32b around the iron metal case 33a in place of the core 32a in FIG. 2. Then, magnetic fluxes are generated in the iron metal case 33a, which makes the fitting state with the plug 40 more reliable. In the above exemplary embodiments, the electronic devices are portable telephone sets. Alternatively, the electronic devices can be PDAs (Personal Digital Assistants) or the like. The iron metal case 33a of the connector 33 may suffice if it is formed such that the fitted plug 40 is attracted by the electromagnet 32. More specifically, the iron metal case 33a may be made of a magnetic body, and can be made of a material such as a plastic material except for the modification in FIG. 5. The housing of the portable telephone set is not limited to a folded type housing but can be, e.g., a slide type housing or straight type housing.

INDUSTRIAL APPLICABILITY

The present invention can be applied to, in addition to portable telephone sets, electronic devices in general each of which has an external device connecting connector to receive power supplied from an external device having a power supplying function.

The invention claimed is:

1. An electronic device comprising:
an external device connecting connector which is connected to a power supplying connector of an external device having a power supplying function and receives power supplied from said external device;
an electronic circuit which performs predetermined operation upon reception of the power supplied from said external device through said external device connecting connector; and
an electromagnet which is provided to said external device connecting connector and electrically connected between said external device connecting connector and said electronic circuit, generates a magnetic force when a power supply current supplied from said external device flows therethrough, and attracts a predetermined portion formed of a magnetic body of said power supplying connector, to maintain a fitting state between said external device connecting connector and said power supplying connector,
wherein
said electronic circuit comprises a rechargeable battery and a charging circuit to charge said rechargeable battery, and
when said charging circuit receives power supplied from said external device through said external device connecting connector to charge said rechargeable battery, during a trickle charging period in which a voltage difference between a power supply and said rechargeable battery becomes smaller than a predetermined value, said charging circuit drives said electromagnet with a charging current having a current value corresponding to the voltage difference to gradually weaken the fitting state between said power supplying connector and said external device connecting connector.

2. An electronic device comprising:
an external device connecting connector which is connected to a power supplying connector of an external device having a power supplying function and receives power supplied from said external device;
an electronic circuit which performs predetermined operation upon reception of the power supplied from said external device through said external device connecting connector; and
an electromagnet which is provided to said external device connecting connector and electrically connected between said external device connecting connector and said electronic circuit, generates a magnetic force when a power supply current supplied from said external device flows therethrough, and attracts a predetermined portion formed of a magnetic body of said power supplying connector, to maintain a fitting state between said external device connecting connector and said power supplying connector, wherein
said electronic circuit comprises a rechargeable battery and a charging circuit to charge said rechargeable battery,
said external device comprises a charging power supply unit having a power supplying function to charge said rechargeable battery, and
when said charging circuit receives power supplied from said charging power supply unit through said external device connecting connector to charge said rechargeable battery, during a quick charging period in which a voltage difference between a power supply and said rechargeable battery is not less than a predetermined value, said charging circuit drives said electromagnet with a charging current having a predetermined current value to maintain a constant fitting state between said power supplying connector and said external device connecting connector, during a trickle charging period in which the voltage difference becomes smaller than the predetermined value, said charging circuit drives said electromagnet with a charging current having a current value corresponding to the voltage difference to gradually weaken the fitting state between said power supplying connector and said external device connecting connector, and at charging end when the voltage difference disappears, said charging circuit stops supplying the charging current to cancel the fitting state.

3. An electronic device according to claim 1, wherein said electromagnet is provided to accompany said external device connecting connector.

4. An electronic device according to claim 1, wherein said electromagnet is arranged in the vicinity of said external device connecting connector.

5. An electronic device according to claim 1, wherein said electromagnet is arranged at a position on said external device connecting connector which opposes a predetermined portion formed of a magnetic body of said power supplying connector when said external device connecting connector and said power supplying connector are fitted with each other.

6. An electronic device according to claim 1, wherein said external device connecting connector comprises a magnetic case which fits with said power supplying connector, and
said electromagnet comprises a coil which is wound around said magnetic case and through which a power supply current supplied from said external device flows.

7. An electronic device according to claim 1, wherein said external device connecting connector is governed by a USB standard.

8. A connector fitting method comprising:
the step of fitting a power supplying connector of an external device having a power supplying function to an external device connecting connector of an electronic device which receives power from the external device; and the step of fitting the two connectors so that an electromagnet which is provided to the external device connecting connector and electrically connected between the external device connecting connector and an electronic circuit generates a magnetic force when a power supply current supplied from the external device flows to an electronic circuit of the external device, and attracts a predetermined portion formed of a magnetic body of the power supplying connector, thus maintaining a fitting state between the external device connecting connector and the power supplying connector, wherein said electronic circuit comprises a rechargeable battery and a charging circuit to charge said rechargeable battery, and when said charging circuit receives power supplied from said external device through said external device connecting connector to charge said rechargeable battery, during a trickle charging period in which a voltage difference between a power supply and said rechargeable battery becomes smaller than a predetermined value, said charging circuit drives said electromagnet with a charging current having a current value corresponding to the voltage difference to gradually weaken the fitting state between said power supplying connector and said external device connecting connector.

9. A connector fitting method comprising:

the step of fitting a power supplying connector of an external device having a power supplying function to an external device connecting connector of an electronic device which receives power from the external device; and the step of fitting the two connectors so that an electromagnet which is provided to the external device connecting connector and electrically connected between the external device connecting connector and an electronic circuit generates a magnetic force when a power supply current supplied from the external device flows to an electronic circuit of the external device, and attracts a predetermined portion formed of a magnetic body of the power supplying connector, thus maintaining a fitting state between the external device connecting connector and the power supplying connector, wherein the step of maintaining comprises the step of driving the electromagnet with a charging current having a predetermined current value, during a quick charging period in which a voltage difference between a power supply and the rechargeable battery of an electronic circuit is not less than a predetermined value, to maintain a constant fitting state between the power supplying connector and the external device connecting connector, and the step of driving the electromagnet with a charging current having a current value corresponding to the voltage difference, during a trickle charging period in which the voltage difference becomes smaller than the predetermined value, to gradually weaken the fitting state between the power supplying connector and the external device connecting connector.

10. A connector fitting method according to claim 9, further comprising the step of stopping supplying the charging current to the electromagnet, at charging end when the voltage difference disappears, to cancel the fitting state.

* * * * *